United States Patent
Huesmann

(10) Patent No.: US 11,976,210 B2
(45) Date of Patent: May 7, 2024

(54) EDGE PROTECTION FOR ELECTROCOAT

(71) Applicant: AXALTA COATING SYSTEMS IP CO., LLC, Wilmington, DE (US)

(72) Inventor: Thomas Huesmann, Solingen-Gräfrath (DE)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 281 days.

(21) Appl. No.: 17/067,249

(22) Filed: Oct. 9, 2020

(65) Prior Publication Data
US 2021/0108104 A1    Apr. 15, 2021

Related U.S. Application Data

(60) Provisional application No. 62/914,206, filed on Oct. 11, 2019.

(51) Int. Cl.
| | | |
|---|---|---|
| *C09D 163/00* | (2006.01) | |
| *C08K 3/30* | (2006.01) | |
| *C08K 3/36* | (2006.01) | |
| *C08K 5/09* | (2006.01) | |
| *C09D 5/44* | (2006.01) | |
| *C25D 9/02* | (2006.01) | |

(52) U.S. Cl.
CPC ........... *C09D 163/00* (2013.01); *C09D 5/443* (2013.01); *C09D 5/4438* (2013.01); *C09D 5/4492* (2013.01); *C25D 9/02* (2013.01); *C08K 2003/3045* (2013.01); *C08K 3/36* (2013.01); *C08K 5/09* (2013.01)

(58) Field of Classification Search
CPC .... C09D 5/443; C09D 5/4438; C09D 5/4488; C09D 5/4492; C25D 13/04; C25D 13/06; C25D 13/10
See application file for complete search history.

(56) References Cited

U.S. PATENT DOCUMENTS

| | | | | |
|---|---|---|---|---|
| 4,064,090 A | * | 12/1977 | Gibson | ................ C08G 59/50 524/901 |
| 10,479,899 B2 | | 11/2019 | Miyamae et al. | |
| 10,676,837 B2 | | 6/2020 | Tersteeg | |
| 2004/0106710 A1 | | 6/2004 | Klein et al. | |
| 2006/0124462 A1 | * | 6/2006 | Morishita | .............. C25D 13/10 204/504 |
| 2018/0051181 A1 | * | 2/2018 | Miyamae | ........... C08G 18/8025 |

FOREIGN PATENT DOCUMENTS

| | | |
|---|---|---|
| CN | 106922151 A | 7/2017 |
| CN | 107969130 A | 4/2018 |
| EP | 1384760 A1 | 1/2004 |
| WO | 0121718 A1 | 3/2001 |
| WO | 03060022 A1 | 7/2003 |
| WO | 2016069545 A1 | 5/2016 |

\* cited by examiner

*Primary Examiner* — Brieann R Johnston
(74) *Attorney, Agent, or Firm* — Lorenz & Kopf, LLP

(57) ABSTRACT

Aqueous cathodic electrocoat compositions with improved edge protection and methods for preparing such electrocoat compositions are described herein. In an exemplary embodiment, an electrocoat composition includes water; a crosslinkable resin comprising a binder of an epoxy-amine adduct and a crosslinking agent; a neutralizing agent for neutralizing the epoxy amine adduct, wherein the neutralizing agent has a pKa value of greater than 0; and a pigment paste. The pigment paste may comprise silica, barium sulfate or silica and barium sulfate.

20 Claims, No Drawings

EDGE PROTECTION FOR ELECTROCOAT

CROSS-REFERENCE TO RELATED APPLICATION

This application claims the benefit of U.S. Provisional Application No. 62/914,206, filed Oct. 11, 2019, of which is hereby expressly incorporated in its entirety by reference.

TECHNICAL FIELD

The technical field generally relates to electrocoat compositions for coating substrates.

BACKGROUND

The coating of electrically conductive substrates by an electrodeposition process also called an electrocoating process is a well-known and important industrial process. Electrodeposition of primers to automotive substrates is widely used in the automotive industry. In this process, a conductive article, such as an autobody or an auto part, is immersed in a bath of a coating composition of an aqueous emulsion of film forming polymer and acts as an electrode in the electrodeposition process. An electric current is passed between the article and a counter-electrode in electrical contact with the aqueous emulsion, until a desired coating is deposited on the article. In a cathodic electrocoating process, the article to be coated is the cathode and the counter-electrode is the anode.

Resin compositions used in the bath of a typical cathodic electrodeposition process also are well known in the art. These resins typically are made from polyepoxide resins which have been chain extended and then an adduct is formed to include amine groups in the resin. Amine groups typically are introduced through reaction of the resin with an amine compound. These resins are blended with a crosslinking agent and then neutralized with an acid to form a water emulsion, which is usually referred to as a principal emulsion.

The principal emulsion is combined with a pigment paste, coalescent solvents, water, and other additives to form the electrocoating bath. The electrocoating bath is placed in an insulated tank containing the anode. The article to be coated is the cathode and is passed through the tank containing the electrodeposition bath. The thickness of the coating that is deposited on the article being electrocoated is a function of the bath characteristics, the electrical operating characteristics, the immersion time, and the like.

The resulting coated article is removed from the bath after a set period of time and is rinsed with deionized water. The coating on the article is cured typically in an oven at sufficient temperature to produce a crosslinked finish on the article.

The lack of edge protection or edge coverage of the composition has been a continuing problem with cathodic electrocoat compositions. There have been various additives proposed in the art to address this problem. However, there remains a desire for electrocoat compositions that have improved coverage at the edges of the coated substrate and which do not impart a negative impact on properties of the electrocoat layer, subsequent coating layers applied thereto, or both.

SUMMARY

Aqueous cathodic electrocoat compositions with improved edge protection and methods for preparing such electrocoat compositions are described herein. In an exemplary embodiment, an electrocoat composition includes water; a crosslinkable resin comprising a binder of an epoxy-amine adduct and a crosslinking agent; a neutralizing agent for neutralizing the epoxy amine adduct, wherein the neutralizing agent has a pKa value of greater than 0; and a pigment paste. The pigment paste may comprise silica, barium sulfate or silica and barium sulfate.

Another exemplary embodiment provides a method for preparing a cathodic electrocoat composition having improved edge protection. The method includes preparing an epoxy amine adduct of an epoxy resin; preparing a crosslinking agent for the epoxy amine adduct; blending the epoxy amine adduct with the crosslinking agent; neutralizing the epoxy amine adduct with a neutralizing agent having a pKa value of greater than about 0 to form an emulsion; and forming a pigment paste and blending the pigment paste with the neutralized emulsion to form a pigment dispersion.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DETAILED DESCRIPTION

The following detailed description is merely exemplary in nature and is not intended to limit the electrocoat compositions and methods for forming electrocoat compositions as described herein. Furthermore, there is no intention to be bound by any theory presented in the preceding background or summary or in the following detailed description.

An electrocoat composition for coating a substrate is provided herein. The electrocoat composition may be utilized to coat any type of substrate known in the art. In embodiments, the substrate is a vehicle, automobile, or automobile vehicle. "Vehicle" or "automobile" or "automobile vehicle" includes an automobile, such as, car, van, minivan, bus, SUV (sports utility vehicle); truck; semi-truck; tractor; motorcycle; trailer; ATV (all-terrain vehicle); pickup truck; heavy duty mover, such as, bulldozer, mobile crane and earth mover; airplanes; boats; ships; and other modes of transport.

The electrocoat composition is utilized to form a coating layer on the substrate. Exemplary embodiments herein provide a full electrocoating bath to form a coating layer on a substrate. Certain embodiments utilize epoxy amine based resins or binders that are neutralized with acids to form emulsions.

Weak edge protection is a major source of corrosion for electrocoated surfaces. It has been observed that bubble or rupture defects are often formed at sharp edges of substrates being electrocoated. During the electrocoating process, extremely high current densities are experienced at sharp edges. Therefore, electrically initiated surface defects may develop and harm edge protection. Typically, efforts to improve edge protection have focused on an improved rheology control, e.g., microgels or P/B-ratio) and on the avoidance of edge escape mechanisms and film shrinkage.

However, herein is described a composition and method for improving edge protection by changing deposition kinetics. Specifically, the composition method described herein controls the deposition process on sharp edges. It is believed that strong acids, such as sulfamic acid, nitric acid or methanesulfonic acid (MSA), used in neutralizing resins for forming the electrocoating emulsion lead to quick deposition at sharp edges, and defects. These strong acids are used to purposes of throwing power and solubility of paint ingredients like catalysts, e.g., Bismuth catalysts). It believed that use of milder acids, in place of the strong acids, leads to slower deposition on sharp edges due to lower electricity transfers. Beneficially, in certain embodiments, the crosslinkable resin is unchanged from existing resins, and the only change made for formation of the emulsion is the replacement of strong acids with mild acids in the neutralizing agent. In an exemplary embodiment, such replacement of strong acids with mild acids is performed on a molar basis of 1:1, such that each molecule of strong acid is replaced by one molecule of mild acid.

As described herein, compositions and methods use acids having a higher pKa, i.e., mild acids, than the strong acids conventionally used in the neutralizing agent. Such weaker acids may include formic acid, DMPA, lactic acid, and acetic acid. As is well known, the pKa value is used to indicate the strength of an acid. pKa is the negative log of the acid disassociation constant, or Ka value. A lower pKa value indicates a stronger acid. That is, the lower the value, the more the acid fully dissociates in water. Of the currently used strong acids, sulfamic acid has a pKa value of −1.05, nitric acid has a pKa of −1.4, and MSA has a pKa of −1.9. The mild acids of embodiments disclosed herein include formic acid with a pKa of 3.75, DMPA with a pKa of 4, lactic acid with a pKa of 3.85, and acetic acid with a pKa of 4.76.

It is believed that these identified mild acids provide for slower and less defective deposition on areas with high current density, such as at sharp edges, and for improved stabilization of bismuth catalyst.

As is further described, compositions and methods described herein further utilize isolating extenders or pigments in conjunction with the milder acids. The combined effect of using milder acids and isolating extenders or pigments has been found to lead to positive contribution on the substrate isolation and build up of wet film resistance in order to achieve improved film build distribution and throwing power.

As used herein, "a," "an," or "the" means one or more unless otherwise specified. The term "or" can be conjunctive or disjunctive. Open terms such as "include," "including," "contain," "containing" and the like mean "comprising." The term "about" as used in connection with a numerical value throughout the specification and the claims denotes an interval of accuracy, familiar and acceptable to a person skilled in the art. In general, such interval of accuracy is ±ten percent. Thus, "about ten" means nine to eleven. All numbers in this description indicating amounts, ratios of materials, physical properties of materials, and/or use are to be understood as modified by the word "about," except as otherwise explicitly indicated. As used herein, the "%" described in the present disclosure refers to the weight percentage unless otherwise indicated.

In certain embodiments, the neutralizing agent has a pKa value of greater than about 0.5. For example, an exemplary neutralizing agent has a pKa value of greater than about 1, such as greater than about 1.5, or greater than about 2. In certain embodiments, the neutralizing agent has a pKa value of greater than about 2.5. For example, an exemplary neutralizing agent has a pKa value of greater than about 3, such as greater than about 3.5, or greater than about 3.7. In an exemplary embodiment, the neutralizing agent has a pKa value of from about 3.7 to about 8. In certain embodiments, the neutralizing agent has a pKa value of less than about 8. For example, an exemplary neutralizing agent has a pKa value of less than about 7, such as less than about 6, or less than about 5. In certain embodiments, the neutralizing agent has a pKa value of less than about 4.8. For example, an exemplary neutralizing agent has a pKa value of from about 3.7 to about 4.8.

In exemplary embodiments, the neutralizing agent is substantially free of acids having a pKa value of less than 3.7. In certain embodiments, the neutralizing agent is substantially free of acids having a pKa value of less than about 3.5. For example, an exemplary neutralizing agent is substantially free of acids having a pKa value of less than about 3, such as less than about 2.5, or less than about 2. In certain embodiments, the neutralizing agent is substantially free of acids having a pKa value of less than about 1.5. For example, an exemplary neutralizing agent is substantially free of acids having a pKa value of less than about 1, such as less than about 0.5, or less than about 0.

In exemplary embodiments, an emulsion is formed from the resin and neutralizing agent, and a dispersion therein is formed by the pigment paste. In such embodiments, an exemplary emulsion (not including the dispersion of pigment paste) is substantially free of acids having a pKa value of less than about 3.7. In certain embodiments, the neutralizing agent is substantially free of acids having a pKa value of less than about 3.5. For example, an exemplary neutralizing agent is substantially free of acids having a pKa value of less than about 3, such as less than about 2.5, or less than about 2. In certain embodiments, the neutralizing agent is substantially free of acids having a pKa value of less than about 1.5. For example, an exemplary neutralizing agent is substantially free of acids having a pKa value of less than about 1, such as less than about 0.5, or less than about 0.

As used herein, a neutralizing agent (or emulsion) that is "substantially free" of delineated acids, may be completely free of the delineated acids, i.e., contain less than the detectable level of the delineated acids, or may include less than 10 mol percent of the delineated acids in relation to the total acid content in the neutralizing agent (or emulsion). For example, a neutralizing agent (or emulsion) that is substantially free of acids having a pKa value of less than about 3.7 may include up to about 10 mol percent of acids having a pKa value of less than about 3.7 and at least 90 mol percent of acids having a pKa value of about 3.7 or greater than about 3.7. In certain embodiments, a neutralizing agent (or emulsion) that is "substantially free" of delineated acids, may include less than 1 mol percent of the delineated acids in relation to the total acid content in the neutralizing agent (or emulsion).

In exemplary embodiments, the neutralizing agent is selected from the group of acids having a pKa value of greater than about 3.7. In certain embodiments, the neutralizing agent is selected from the group consisting of formic acid, dimethylolpropionic acid (DMPA), lactic acid, and acetic acid, and combinations thereof. For example, the neutralizing agent may comprise formic acid, DMPA, lactic acid, and/or acetic acid. In certain embodiments, the neutralizing agent may consist of formic acid, DMPA, lactic acid, and acetic acid. In other embodiments, the neutralizing agent may consist of three acids selected from formic acid, DMPA, lactic acid, and acetic acid. Another exemplary neutralizing agent may consist of two acids selected from formic acid, DMPA, lactic acid, and acetic acid. Certain exemplary neutralizing agents may consist of formic acid. Other exemplary neutralizing agents may consist of DMPA. Still other exemplary neutralizing agents may consist of lactic acid. Yet other exemplary neutralizing agents may consist of acetic acid.

An exemplary aqueous cathodic electrocoat composition is formed as an emulsion of the resin, i.e., binder, and neutralizing agent with a dispersion of the pigment paste therein. In certain embodiments, the emulsion includes less than about 60 millimoles (mmol) of the neutralization agent per hundred grams of solids in the emulsion; such as less than 50 mmol, for example less than 40 mmol, or less than 35 mmol, of the neutralization agent per hundred grams of solids in the emulsion. In certain embodiments, the emulsion includes greater than about 10 millimoles (mmol) of the neutralization agent per hundred grams of solids in the emulsion; such as greater than 15 mmol, for example greater than 20 mmol, greater than 25 mmol or greater than 30 mmol, of the neutralization agent per hundred grams of solids in the emulsion.

Any suitable ratio of acids in the neutralization agent may be utilized. For example, the neutralization agent may have a (formic acid):(DMPA):(lactic acid):(acetic acid) ratio of about (2 to 4):(3 to 4):(1 to 3):(20 to 30).

Any suitable amounts of specific acids in total acid content (100 mol %) of the neutralization agent may be utilized. In an exemplary embodiment, the neutralization agent includes from about 2.5 to about 20 mol % formic acid, such as from about 5 to about 15 mol % formic acid, for example from about 7.5 to about 12.5 mol % formic acid, or from about 8 to about 10 mol % formic acid. In an exemplary embodiment, the neutralization agent includes from about 5 to about 20 mol % DMPA, such as from about 7.5 to about 15 mol % DMPA, for example from about 10 to about 12 mol % DMPA. In an exemplary embodiment, the neutralization agent includes from about 1 to about 20 mol % lactic acid, such as from about 2 to about 15 mol % lactic acid, for example from about 5 to about 10 mol % lactic acid, or from about 6 to about 8 mol % lactic acid. In an exemplary embodiment, the neutralization agent includes from about 50 to about 90 mol % acetic acid, such as about 60 to about 90 mol % acetic acid, for example from about 65 to about 80 mol % acetic acid, or from about 70 to about 75 mol % acetic acid.

In an exemplary embodiment, after formation of the emulsion from the resin and neutralizing agent, the emulsion may include, based on 100 grams of solids in the emulsion, from about 20 to about 60, such as from about 25 to about 45, for example from about 30 to about 35, or from about 32 to about 34 millimoles (mmol) of acid from the neutralizing agent. In certain embodiments, the emulsion includes less than about 60 mmol of the neutralization agent per hundred grams of solids in the emulsion; such as less than 50 mmol, for example less than 40 mmol, or less than 35 mmol, of the neutralization agent per hundred grams of solids in the emulsion. In certain embodiments, the emulsion includes greater than about 10 mmol of the neutralization agent per hundred grams of solids in the emulsion; such as greater than 15 mmol, for example greater than 20 mmol, greater than 25 mmol or greater than 30 mmol, of the neutralization agent per hundred grams of solids in the emulsion.

In an exemplary embodiment, after formation of the emulsion from the resin and neutralizing agent, the emulsion may include, based on 100 grams of solids in the emulsion, from about 1 to about 6, such as from about 2 to about 4, for example from about 2.3 to about 3.5, or from about 2.8 to about 3.2 mmol formic acid; from about 1 to about 10, such as from about 2 to about 6, for example from about 3 to about 5, or from about 3.5 to about 4 mmol DMPA; from about 0.5 to about 6, such as from about 1 to about 4, for example from about 1.5 to about 3, or from about 2 to about 2.5 mmol lactic acid; and from about 10 to about 40, such as from about 15 to about 30, for example from about 20 to about 28, or from about 23 to about 25 mmol acetic acid.

In an exemplary embodiment, the emulsion comprises from about 1 to about 5 mmol of formic acid per 100 grams of solids; from about 1 to about 5 mmol of DMPA per 100 grams of solids; from about 1 to about 5 mmol of lactic acid per 100 grams of solids; and from about 20 to about 30 mmol of acetic acid per 100 grams of solids. For example, an exemplary emulsion comprises from about 2.5 to about 3.5 mmol of formic acid per 100 grams of solids; from about 3 to about 4 mmol of DMPA per 100 grams of solids; from about 2 to about 3 mmol of lactic acid per 100 grams of solids; and from about 22 to about 26 mmol of acetic acid per 100 grams of solids.

In certain embodiments of the aqueous cathodic electrocoat composition, the pigment paste includes barium sulfate and/or silica. An exemplary pigment paste comprises, based on a total pigment content weight, at least about 0.5 weight percent (wt %) barium sulfate, such as at least about 1 wt %, for example at least about 1.5 wt %, or at least about 2 wt % barium sulfate. An exemplary pigment paste comprises, based on a total pigment content weight, no more than about 5 wt % barium sulfate, such as no more than about 4 wt %, for example no more than about 5 wt %, or no more than about 2.5 wt % barium sulfate. An exemplary pigment paste comprises, based on a total pigment content weight, at least about 1 wt % silica, such as at least about 2 wt %, for example at least about 2.5 wt %, or at least about 3 wt % silica. An exemplary pigment paste comprises, based on a total pigment content weight, no more than about 6 wt % silica, such as no more than about 5 wt %, for example no more than about 4 wt %, or no more than about 3.5 wt % silica.

In an exemplary embodiment, an epoxy amine based emulsion is formed by neutralizing a conventional crosslinkable resin comprising a binder and a crosslinking agent. Preparation of such a resin is known in the previous arts, such as in U.S. Pat. No. 6,207,731, which is incorporated by reference. Herein, such resin is neutralized with a neutralizing agent of mild acids including formic acid, dimethylolpropionic acid (DMPA), lactic acid, and acetic acid. The resulting emulsion contains 3.0 mmol of formic acid per hundred grams of solids, 3.7 mmol of DMPA per hundred grams of solids, 2.3 mmol of lactic acid per hundred grams of solids, and 24.5 mmol of acetic acid per hundred grams of solids, for a total of 33.5 mmol of neutralizing acids per hundred grams of solids in the emulsion.

In an exemplary embodiment, the solid content of the emulsion is from about 35 to about 40%.

Further, in the exemplary embodiment, a pigment paste is formed from the components shown in Table A:

TABLE A

| Pigment Paste | | |
| --- | --- | --- |
| Component | % solid | Grams |
| Demineralized Water | 0% | 35.38 |
| Formic acid 50% | 50% | 0.87 |
| Resydrol SWE 5872/60 | 60% | 14.00 |
| Butylcellusolve | 0% | 1.00 |
| Hexylcellusolve | 0% | 1.00 |
| Solution Surfynol 104 | 50% | 1.1 |
| PRINTEX 200 | 100% | 0.50 |
| TI-PURE R960-38 | 100% | 0.00 |
| Ti KRONOS 2190 | 100% | 18.00 |
| SILITIN Z 86 | 100% | 25.65 |
| ACEMATT OK 412 Silica | 100% | 1.5 |

TABLE A-continued

Pigment Paste

| Component | % solid | Grams |
|---|---|---|
| BLANCFIXE HD-80 (BaSO4) | 100% | 1.00 |
| TOTAL | | 100.00 |

Specifically, the materials in the table were mixed in suitable container until a homogeneous mixture formed. The mixture may be later dispersed by charging into an Eiger mill. In an exemplary embodiment, the solid content of the pigment paste is 40 to about 50%.

In certain embodiments, the pigment paste is prepared by grinding or dispersing a pigment into a grinding vehicle and optional ingredients such as wetting agents, surfactants, and defoamers. Any of the pigment grinding vehicles that are well known in the art can be used or the novel additive described above can be used. After grinding, the particle size of the pigment should be as small as practical, generally, the particle size is about 6-8 using a Hegman grinding gauge.

Pigments which can be used in embodiments described herein include titanium dioxide, basic lead silicate, strontium chromate, carbon black, iron oxide, clay and the like. Pigments with high surface areas and oil absorbencies should be used judiciously because these can have an undesirable affect on coalescence and flow of the electrodeposited coating.

In certain embodiments, the pigment paste includes an anti-corrosive pigment or blends of anticorrosive pigments. Exemplary anti-corrosive pigments include metallic chromates, phosphates, phosphites, borates, borosilicates, phosphosilicates, molybdates, oxides, and rare earth compounds. Organic anticorrosive agents may optionally also be present; they include benzotriazoles, morpholines, azoles, calcium alkyl-aryl sulfonates, diamines, and metal salts of dinonylnaphthalene sulfonates.

The pigment paste is blended into the emulsion to form a pigment dispersion therein. The pigment to binder weight ratio may be less than about 0.5:1, such as less than about 0.4:1, and for example about 0.1:1 to 0.4:1, such as 1:5. Higher pigment to binder weight ratios have been found to adversely affect coalescence and flow.

The electrocoat compositions can contain optional ingredients such as wetting agents, surfactants, defoamers, plasticizers The electrocoat composition may be described herein as an aqueous dispersion. The term "dispersion" as used within the context herein is believed to be a two-phase translucent or opaque aqueous resinous binder system in which the binder is in the dispersed phase and water the continuous phase. The average particle size diameter of the binder phase is about 0.1 to 10 microns, preferably, less than 5 microns. The concentrations of the binder in the aqueous medium in general is not critical, but ordinarily the major portion of the aqueous dispersion is water. The aqueous dispersion usually contains from about 3 to 50 percent preferably 5 to 40 percent by weight binder solids. Aqueous binder concentrates which are to be further diluted with water when added to an electrocoating bath, generally have a range of binder solids of 10 to 30 percent weight.

As compared to conventional aqueous cathodic electrocoat composition formed from strong neutralizing acids, an aqueous cathodic electrocoat composition formed from the above described neutralizing agents exhibited improved edge protection by about 10% under testing, i.e., surface damage was reduced by 10%. Further, an aqueous cathodic electrocoat composition formed from the above described neutralizing agents and the addition of silica exhibited improved edge protection by about 25% under testing. Adding both the described amounts of silica and barium sulfate to an aqueous cathodic electrocoat composition formed from the above described neutralizing agents led to an improvement over the conventional aqueous cathodic electrocoat composition formed from strong neutralizing acids by about 50%.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment. It being understood that various changes may be made in the function and arrangement of elements described in an exemplary embodiment without departing from the scope as set forth in the appended claims.

What is claimed is:

1. An aqueous cathodic electrocoat composition having improved edge protection, the composition comprising:
   water;
   a crosslinkable resin comprising:
      a binder, and
      a crosslinking agent;
   a neutralizing agent for neutralizing the binder, wherein the neutralizing agent comprises a mixture of formic acid, dimethylolpropionic acid (DMPA), lactic acid, and acetic acid; and
   a pigment paste,
   wherein the water, the crosslinkable resin, and neutralizing agent form an emulsion, and wherein the emulsion comprises:
   (A) from about 1 to about 5 mmol of formic acid per 100 grams of solids, from about 1 to about 5 mmol of DMPA per 100 grams of solids, and from about 1 to about 5 mmol of lactic acid per 100 grams of solids;
   (B) from about 1 to about 5 mmol of formic acid per 100 grams of solids, from about 1 to about 5 mmol of DMPA per 100 grams of solids, and from about 20 to about 30 mmol of acetic acid per 100 grams of solids;
   (C) from about 1 to about 5 mmol of formic acid per 100 grams of solids, from about 1 to about 5 mmol of lactic acid per 100 grams of solids, and from about 20 to about 30 mmol of acetic acid per 100 grams of solids; or
   (D) from about 1 to about 5 mmol of DMPA per 100 grams of solids, from about 1 to about 5 mmol of lactic acid per 100 grams of solids, and from about 20 to about 30 mmol of acetic acid per 100 grams of solids.

2. The composition of claim 1 wherein the neutralizing agent consists of acids having a pKa value of greater than 3.

3. The composition of claim 1 wherein the neutralizing agent consists of acids having a pKa value of greater than 3.7.

4. The composition claim 1 wherein the neutralizing agent is substantially free of acids having a pKa value of less than 0.

5. The composition claim 1 wherein the neutralizing agent is substantially free of acids having a pKa value of less than 3.

6. The composition of claim 1 wherein the emulsion comprises:
   from about 1 to about 5 mmol of formic acid per 100 grams of solids;
   from about 1 to about 5 mmol of DMPA per 100 grams of solids;
   from about 1 to about 5 mmol of lactic acid per 100 grams of solids; and
   from about 20 to about 30 mmol of acetic acid per 100 grams of solids.

7. The composition of claim 1 wherein the neutralizing agent consists of a mixture of formic acid, dimethylolpropionic acid (DMPA), lactic acid, and acetic acid.

8. The composition of claim 1 wherein the pigment paste includes barium sulfate.

9. The composition of claim 1 wherein the pigment paste includes silica and barium sulfate.

10. The composition of claim 1 wherein:
    the neutralizing agent consists of a mixture of formic acid, dimethylolpropionic acid (DMPA), lactic acid, and acetic acid; and
    the pigment paste includes silica and barium sulfate.

11. A method for preparing a cathodic electrocoat composition having improved edge protection, the method comprising:
    1) Preparing an epoxy amine adduct of an epoxy resin;
    2) Preparing a crosslinking agent for the epoxy amine adduct;
    3) Blending the epoxy amine adduct with the crosslinking agent;
    4) Neutralizing the epoxy amine adduct with a neutralizing agent to form an emulsion; and
    5) forming a pigment paste and blending the pigment paste with the neutralized emulsion to form a pigment dispersion; wherein:
    the neutralizing agent is comprised of formic acid, dimethylolpropionic acid (DMPA), lactic acid, and acetic acid; and
    the emulsion comprises:
      from about 1 to about 5 mmol of formic acid per 100 grams of solids;
      from about 1 to about 5 mmol of DMPA per 100 grams of solids;
      from about 1 to about 5 mmol of lactic acid per 100 grams of solids; and
      from about 20 to about 30 mmol of acetic acid per 100 grams of solids.

12. The method of claim 11 wherein:
    the neutralizing agent consists of formic acid, dimethylolpropionic acid (DMPA), lactic acid, and acetic acid; and
    the emulsion comprises:
      from about 2.5 to about 3.5 mmol of formic acid per 100 grams of solids;
      from about 3 to about 4 mmol of DMPA per 100 grams of solids;
      from about 2 to about 3 mmol of lactic acid per 100 grams of solids; and
      from about 22 to about 26 mmol of acetic acid per 100 grams of solids.

13. The method of claim 11 wherein:
    the emulsion comprises:
      from about 2.5 to about 3.5 mmol of formic acid per 100 grams of solids;
      from about 3 to about 4 mmol of DMPA per 100 grams of solids;
      from about 2 to about 3 mmol of lactic acid per 100 grams of solids; and
      from about 22 to about 26 mmol of acetic acid per 100 grams of solid.

14. The method of claim 11 wherein:
    the neutralizing agent consists of acids having a pKa value of greater than 3; and
    the pigment paste comprises silica and barium sulfate.

15. The method of claim 11 wherein:
    the neutralizing agent consists of acids having a pKa value of from 3.7 to 8; and
    the pigment paste comprises silica and barium sulfate.

16. An aqueous cathodic electrocoat composition having improved edge protection, the composition comprising:
    water;
    a crosslinkable resin comprising:
      a binder, and
      a crosslinking agent;
    a neutralizing agent for neutralizing the binder, wherein the neutralizing agent comprises a mixture of formic acid, dimethylolpropionic acid (DMPA), lactic acid, and acetic acid; and
    a pigment paste,
    wherein the water, the crosslinkable resin, and neutralizing agent form an emulsion comprising:
      from about 1 to about 5 mmol of formic acid per 100 grams of solids;
      from about 1 to about 5 mmol of DMPA per 100 grams of solids;
      from about 1 to about 5 mmol of lactic acid per 100 grams of solids; and
      from about 20 to about 30 mmol of acetic acid per 100 grams of solids.

17. The composition of claim 1 wherein the emulsion comprises:
    from about 1 to about 5 mmol of formic acid per 100 grams of solids;
    from about 1 to about 5 mmol of DMPA per 100 grams of solids; and
    from about 1 to about 5 mmol of lactic acid per 100 grams of solids.

18. The composition of claim 1 wherein the emulsion comprises:
    from about 1 to about 5 mmol of formic acid per 100 grams of solids;
    from about 1 to about 5 mmol of DMPA per 100 grams of solids; and
    from about 20 to about 30 mmol of acetic acid per 100 grams of solids.

19. The composition of claim 1 wherein the emulsion comprises:
    from about 1 to about 5 mmol of formic acid per 100 grams of solids;
    from about 1 to about 5 mmol of lactic acid per 100 grams of solids; and
    from about 20 to about 30 mmol of acetic acid per 100 grams of solids.

20. The composition of claim 1 wherein the emulsion comprises:
    from about 1 to about 5 mmol of DMPA per 100 grams of solids;
    from about 1 to about 5 mmol of lactic acid per 100 grams of solids; and
    from about 20 to about 30 mmol of acetic acid per 100 grams of solids.

* * * * *